United States Patent [19]
Ferraiolo et al.

[11] Patent Number: 5,220,581
[45] Date of Patent: Jun. 15, 1993

[54] DIGITAL DATA LINK PERFORMANCE MONITOR

[75] Inventors: Frank D. Ferraiolo, New Windsor, N.Y.; John E. Gersbach; Ilya Iosephovich Novof, both of Burlington, Vt.

[73] Assignee: International Business Machines, Armonk, N.Y.

[21] Appl. No.: 676,638

[22] Filed: Mar. 28, 1991

[51] Int. Cl.$^5$ ............................ H04B 3/46; H03D 3/24
[52] U.S. Cl. ...................................... 375/10; 375/118; 370/105.3; 370/108
[58] Field of Search .................. 375/10, 118, 119, 81, 375/82, 120; 370/105.3, 108; 364/484; 324/77 H

[56] References Cited

U.S. PATENT DOCUMENTS

| | | | |
|---|---|---|---|
| 4,211,920 | 7/1980 | Wakabayashi | 385/24 |
| 4,278,850 | 7/1981 | Sato et al. | 370/13.1 |
| 4,367,550 | 1/1983 | Douverne | 371/5.2 |
| 4,435,849 | 3/1984 | Ilgner et al. | 359/117 |
| 4,501,021 | 2/1985 | Weiss | 370/85.12 |
| 4,580,263 | 4/1986 | Watanabe | 371/5.2 |
| 4,628,507 | 12/1986 | Otani | 371/5.2 |
| 4,660,973 | 4/1987 | Mannschke | 359/110 |
| 4,672,639 | 6/1987 | Tanabe et al. | 375/118 |
| 4,677,648 | 6/1987 | Zurfluh | 375/120 |
| 4,710,976 | 12/1987 | Wakabayashi | 455/9 |
| 4,841,551 | 6/1989 | Avaneas | 375/119 |
| 4,984,249 | 1/1991 | Long et al. | 375/119 |
| 5,003,561 | 3/1991 | Dragotin | 375/119 |
| 5,022,056 | 6/1991 | Henderson et al. | 375/119 |
| 5,022,057 | 6/1991 | Nishi et al. | 375/119 |
| 5,095,498 | 3/1992 | DeLuca et al. | 375/119 |

FOREIGN PATENT DOCUMENTS

| | | |
|---|---|---|
| 3133724A1 | 3/1983 | Fed. Rep. of Germany . |
| 56-32842 | 4/1981 | Japan . |
| 57-75040 | 5/1982 | Japan . |
| 58-123247 | 7/1983 | Japan . |
| 61-29245 | 2/1986 | Japan . |
| 61-196634 | 8/1986 | Japan . |
| 62-245827 | 10/1987 | Japan . |
| 2191356A | 12/1987 | United Kingdom . |

OTHER PUBLICATIONS

Cooke et al., "Integrated Circuits of a 200 Mbit/s Fiber-Optic Link," IEEE J. Solid State Cir., vol. SC-21, No. 6, 1986. pp. 909-915.

Uda et al., "Integ. Opt. Fiber Data Link Transmitter/-Receiv. for Area Net. Appln.," Fiber & Integ. Optics, vol. 5, No. 5, 1985. pp. 273-289.

"Amer. Nat. Standard for Info. Sys. Fiber Distribution Data Interface (FDDI). Phys. Layer Med. Dep. (PMD)", Amer. National Standards Inst., Inc., Appendix E-System Jitter Allocations, Rev. 4, Apr., 1989.

*Transmission Systems for Communications* AT&T Bell Lab, Chapter 30, pp. 703-715 & 756 & 757, Ed. 5.

*Primary Examiner*—Curtis Kuntz
*Assistant Examiner*—Young Tse
*Attorney, Agent, or Firm*—Heslin & Rothenberg

[57] ABSTRACT

A digital data link performance monitor technique for communication systems and information and data processing systems is disclosed. The technique is based on the integration and analysis of a plurality of sorted data edge transitions of a serial data stream received over the digital data link. The number of data edge sorts to each of n time intervals definitive of the edge histogram is compared with a predetermined threshold level and a monitor signal is generated with each comparison. The combination of monitor signals is then analyzed to determine the amount of data timing jitter, and therefore the quality of the link. Corresponding methods and circuits are described.

21 Claims, 3 Drawing Sheets fig. 1 fig. 2 fig. 3 fig. 5 fig. 4

DIGITAL DATA LINK PERFORMANCE MONITOR

BACKGROUND OF THE INVENTION

1. Technical Field

This invention relates in general to communication systems and information and data processing systems, and more particularly, to techniques for evaluating data link performance by measuring the quality of data received through the link.

2. Description of the Prior Art

By way of explanation, a digital communication link, such as a high speed fiber optic data communication link, typically consists of a transmitter, a line (for example, an optical fiber) and a receiver. In a fiber optic communication link, the transmitter converts electrical data signals into optical pulses and couples them into the optical fiber. The optical signal is typically attenuated and distorted as it passes through the optical fiber. At the receiving end, a photodetector converts optical signals into electrical data pulses and, conventionally, a link status monitor measures the amplitude of the photodetector output current.

In one status monitoring technique, if the average photocurrent amplitude exceeds a predefined level, an assumption is made that the arriving data is valid. Conversely, if the average photocurrent is less than the predetermined level, it is assumed that there is a broken fiber or other failed link component, e.g., a failed transmitter module (see Cooke et al., "Integrated Circuits for a Two Hundred - Mbit/s Fiber Optic Link," IEEE J. Solid State Circuits, Vol. SC-21, No. 6, December, 1986). Another known method of monitoring link status is based on peak detecting of the analog signal from the receiver (see Uda et al., "Integrated Optical Fiber Data Link Transmitter/Receiver for Local Area Network Application," Fiber and Integrated Optics, Vol. 5, Nov. 3, 1985).

Both of the above-identified analog-type link status monitoring techniques indicate whether the optical power level (i.e., amplitude) is satisfactory, but neither provides information on possible subtle degradation in data signal quality. In the case of degradation, the data signal still passes through the digital data link, but data jitter may exceed or be close to exceeding predefined specification requirements for the link. This data timing jitter may result in the data bit error rate becoming unacceptably high. Such a situation could occur, for example, if the optical fiber became damaged or the optical connectors became obstructed.

Pursuant to the present invention, timing jitter, which is used as a measure of circuit degradation, is measured as a deviation from the ideal time position of the received signal. Three types of jitter are normally identified in fiber optic communication links, i.e., duty cycle distortion, data dependent jitter and random jitter (see "American National Standard for Information Systems — Appendix E — System Jitter Allocations," Rev. 4, April, 1989). Duty cycle distortion, also called pulse width distortion, is often caused by differences in propagation delay between low-to-high and high-to-low data transitions. Data dependent jitter is caused by imperfections in gain and phase characteristics of the transmission channel. It is also partially due to inter data symbol interference from a bandwidth limited non-Nyquist channel. Data dependent jitter also includes effects of non-dc balanced coding. Random jitter is caused primarily by thermal noise and normally its average is zero. The major contributor of random jitter is the optical receiver. In summary, applicants are unaware of any pre-existing digital technique which monitors data timing jitter as a measure of the quality of the data link over which the data has been received.

In view of the above, there exists a need in the art for a data link performance monitor capable of evaluating data link performance degradation before an actual fail occurs and, in particular, for such a monitor/diagnostic tool which digitally evaluates the received data signal quality (i.e., by analyzing data timing jitter) as an indication of data link performance.

SUMMARY OF THE INVENTION

The present invention comprises in one aspect a method for evaluating a digital data link having a stream of digital signals serially transmitted therethrough at a certain clock rate. The method includes the steps of: sorting in time a plurality of data edge transitions of the serial stream into n time intervals, the cumulative length of the n time intervals being substantially equal to the data stream clock rate; comparing the number of data edge transitions sorted to each of the n time intervals with a predetermined threshold level; generating, in response to the comparing step, a monitor signal for each of the n time intervals, a first monitor signal being generated if the number of data edge sorts in a time interval exceeds the predetermined threshold level and a second monitor signal being generated if the number of data edge sorts in a time interval is less than the predetermined threshold level; and evaluating the data timing jitter of the stream of digital signals transmitted through the data link by an analysis of the monitor signals generated.

As enhanced processing, the method may include the step of generating, in response to the evaluating step, a flag signal indicative of the performance of the digital data link. The generated flag signal may include: a first flag representative of negligible data timing jitter in the digital signal stream; a second flag indicative of data timing jitter marginally meeting predefined data link specification, and a third flag representative of excessive data timing jitter, i.e., jitter failing to meet predefined data link specification. If desired, additional flag signals could also be provided. Further method features are also described and claimed herein.

In another aspect, the invention comprises a circuit for evaluating the data timing jitter of a stream of digital signals serially transmitted through a digital data link at a certain clock rate. The circuit includes sorting means for sorting in time each of a plurality of data edge transitions of the serially transmitted data stream to one of n successive time intervals. The cumulative length of the n time intervals is substantially equal to the data stream clock rate. The circuit also includes comparing means coupled to the sorting means for comparing the number of data edge transitions sorted to each of the n time intervals with a predetermined threshold level, and generating means for generating a monitor signal for each of the n time intervals. A first monitor signal is generated if the number of data edge sorts to the particular time interval under evaluation exceeds the predetermined threshold level and a second monitor signal is generated if the number of data edge sorts to the particular time interval is less than the predetermined threshold level. Lastly, evaluating means evaluates the data timing jitter of the stream of digital signals serially transmitted through the link through an analysis of the generated monitor signals as an indication of the performance of the digital data link.

In one specific embodiment, the circuit includes n counters, each of the counters being coupled to receive a data edge sorts to a corresponding one of the n time intervals. Further, n comparators may be provided, each comparator being coupled to a respective one of the n counters for comparing the number of data edge transitions sorted to its respective counter with the predetermined threshold level. The outputs of the n comparators may comprise the generated monitor signals. Further specific circuit details are also provided and claimed herein. For example, the monitoring technique of the present invention may be used contemporaneous with the data retiming method set forth in a commonly assigned, co-pending patent application entitled "Digitally Integrating Clock Extractor," which is summarily discussed herein.

The present inventive technique, whether method or circuit, features the creation of a histogram of a preselected number of data edge transitions and the use thereof to evaluate data timing jitter. The timing jitter measurement technique described herein is advantageously accomplished contemporaneous with clock extraction and utilizes much of the same digital circuitry. The technique is suitable for high speed applications, and data jitter measurement accuracy is designable to particular application requirements. The technique can be realized in hardware or in hardware/software combinations.

BRIEF DESCRIPTION OF THE DRAWINGS

These and other objects, advantages and features of the present invention will be more readily understood from the following detailed description of certain preferred embodiments of the present invention, when considered in conjunction with the accompanying drawings in which.

DETAILED DESCRIPTION OF THE INVENTION

As noted above, this invention presents a novel technique for the digital measurement of timing noise inherent in data received over a digital data link, such as a communication link and, more particularly, a fiber optic communication link. This monitoring and/or diagnostic technique advantageously permits data timing jitter measurement simultaneous with clock extraction, and beneficially uses much of the same circuitry and associated signals as the clock extraction approach described in co-pending application Ser. No. 07/594,242 entitled "Digital Integrating Clock Extractor," assigned to the same assignee as the present invention, and the entirety of which is hereby incorporated herein by reference. Briefly described, the technique set forth in this co-pending application allows for selection of an appropriate clock signal, from a plurality of locally generated clock signals of different phase, for use in retiming a serial data stream. The technique is based on the integration and periodic analysis of a plurality of time sorted data edge transitions. The performance monitoring/diagnostic technique of the present invention readily integrates with this digital integrating clock extractor in that the histogram created to drive the selection of a retiming signal is also used to evaluate data timing jitter, and thus the quality of the data link through which the data is received.

Figure 1:
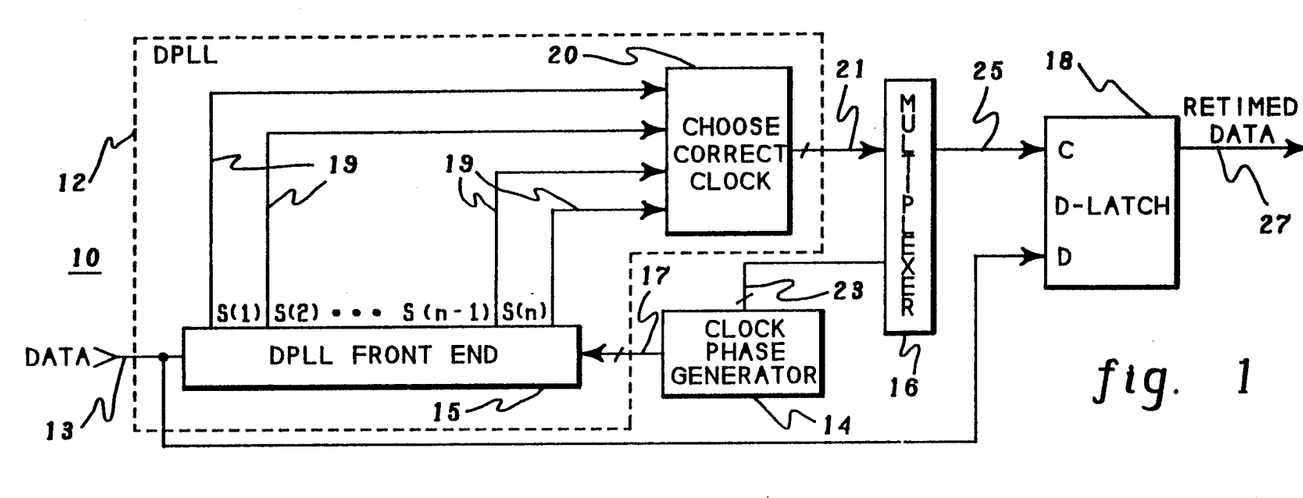
FIG. 1 is a block diagram representation of a digital phase locked logic (DPLL) data retiming circuit useful in combination with the present invention.

A generalized embodiment of a data retiming circuit, denoted 10, is depicted in FIG. 1. Retiming circuit 10 includes a digital phase locked logic circuit (DPLL) 12, a clock phase generator 14, a multiplexer 16 and an edge triggered D-latch 18. DPLLs are now well known in the art and will therefore not be described in detail herein. (An early survey is given in an article by W. C. Lindsey et al., entitled "Survey of Digital Phase Locked Loops," Proceedings of the IEEE, Vol. 69, No. 4, pp. 410-431, April, 1981.) In operation, a serial stream of clock and data signals to be retimed, and subsequently deserialized, is received on line 13 which is coupled to an input of DPLL front end circuit 15. DPLL front end circuit 15 results from a somewhat arbitrary division of DPLL 12. Circuit 15 receives from generator 14 on line 17 a plurality of clock signals of different phase. Generator 14 and circuit 15 components may include, for example, a local clock generator, a clock delay line and data edge sorting circuitry. One circuit embodiment of these components is described by E. A. Zurfluh in U.S. Pat, No. 4,677,648, entitled "Digital Phase Locked Loop Synchronizer," assigned to the same assignee as the present invention. Another, and preferred approach to data edge transition sorting is described in co-pending application Ser. No. 07/550,516, entitled "Data Edge Phase Sorting Circuits," also assigned to the same assignee as the present invention, and the entirety of which is hereby incorporated herein by reference. An overview of this edge sorting circuitry is briefly described herein with reference to FIG. 2 hereof.

Figure 2:
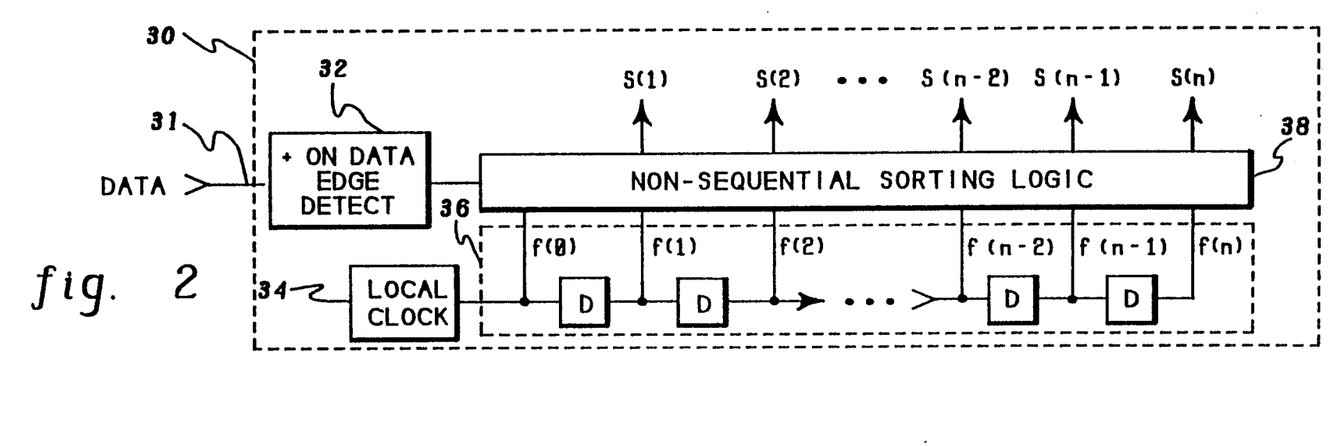
FIG. 2 is a block diagram representation of a data edge phase sorting circuit useful in combination with the present invention.

As shown in FIG. 2, a serial stream of data signals and clock signals is fed via line 31 to + on data edge detect circuit 32. Circuit 32 extracts either the rising, falling, or both the rising and falling data edge transitions occurring on line 31. The circuit generally comprises a single shot pulse generator which provides, for example, a positive output pulse to a non-sequential sorting logic circuit 38 upon receipt of a data edge transition of the desired type. Non-sequential sorting logic 38 compares these output pulses from detect circuit 32 with a plurality (n) of delay clocks f(0), f(1) ... f(n−1), f(n) generated by a delay line 36 driven by the local master clock 34. Non-sequential sorting logic 38 outputs signals S(1), S(2) ... S(n-1), S(n), which again flag a data edge transition location relative to the local clock. The frequency of occurrence of each sorted output is stored in n subsequent counters discussed below in connection with FIG. 4.

Returning to FIG. 1, and as already noted, DPLL front end circuit 15, through its data edge sorting circuitry (FIG. 2), outputs a plurality of pulse signals, S(1), S(2) ... S(n-1) & S(n), on an equivalent number of lines 19 which are coupled to a choose correct clock circuit 20. Circuits 15 and 20 essentially comprise digital phase locked logic circuit 12, as shown in phantom in FIG. 1. The n outputs S(1), S(2) ... S(n-1) & S(n) from circuit 15 represent discrete time intervals relative to the DPLL local clock. The leading edge of one time interval occurs precisely at the trailing edge of the previous interval. A pulse signal for each data edge transition of the serial stream is provided on a corresponding one of the n outputs of circuit 15 to signify the location in time of the transition relative to the DPLL local clock.

Choose correct clock circuit 20 operates to select a proper local clock phase for use in data retiming from a plurality of local clocks of identical frequency but different phase. As described above, pursuant to the cross-referenced application clock selection is made based upon an analysis of the historical distribution of a predefined number of data edge transitions. In practice, the local reference clock produced by generator 14 and used by DPLL circuit 12 is configured to cover one period or slightly more of the input data clock, which is assumed known. This guarantees that each data edge transition will be detected and sorted into one of the n time intervals. Those counters (see FIG. 4) associated with the time intervals where data edge transitions are occurring will accumulate counts at a faster rate than the remaining counters, even under a jitter or high noise condition. This information is beneficially used to select an appropriate clock signal phase, as well as pursuant to the present invention to monitor/diagnose the data link performance. Counters (FIG. 4) within choose correct clock circuit 20 thus integrate (i.e., accumulate a histogram or historic overview of) the locations of successively sorted data edge transitions. This histogram is advantageously used herein as explained further below with reference to FIG. 3 hereof.

Continuing with the retiming function, an identification of a selected clock signal is output from DPLL 12 on line 21 to a multiplexer 16 which also receives as input (on line 23) a plurality of local clock signals of different phase produced by clock phase generator 14. The output (on line 25) of multiplexer 16 is fed to the clock input "C" of the edge triggered data latch 18. A second data input "D" to latch 18 is coupled to line 13 for receiving the serial data stream. Data is latched on either the rising or falling clock edge. Retimed data is output from latch 18 on line 27, for example, to a deserialization circuit (not shown).

Figure 3:
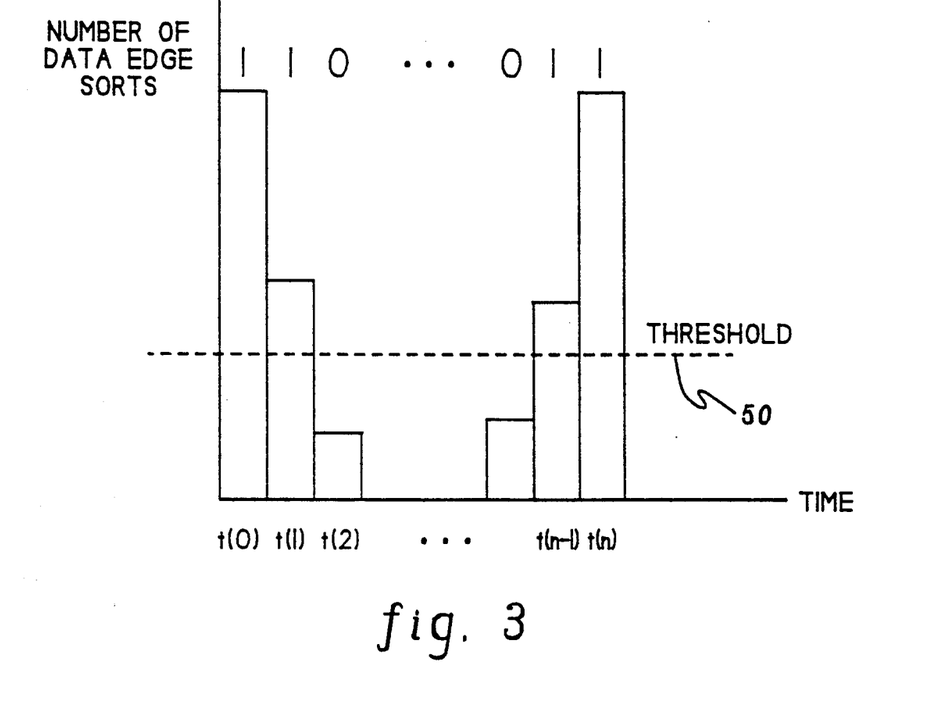
FIG. 3 is a graphical representation of a histogram of sorted data edge transitions useful in explaining the present invention.

Graphic representation of a plurality of sorted data edge transitions is shown in FIG. 3. In this case, n clock phases have been used to sort data edges into n successive time intervals or time segments. The first time interval is from t(0) to t(1), the second one from t(1) to t(2), etc ..., the nth time interval is from t(n−1) to t(n). As noted above, these time intervals are selected to cover the entire data clock period T. Times t(0), t(1) ... t(n) are the time shifts of the clock phases f(1), ... f(n) in reference to f(0). The degree of timing or horizontal shrinkage of the eye can be derived from the information depicted in FIG. 3 (see *Transmission Systems for Communications*. AT&T Bell Lab, Ch. 30, Ed. 5).

The measurement of the total timing jitter is the effective symbol duration decrease or amount of horizontal shrinkage of the eye diagram, as defined by equation (1).

$$\text{jitter} = |\text{nominal bit duration} - \text{measured bit duration}| \quad (1)$$

For example, a generalized threshold level 50 can be chosen for comparison with the number of data sorts collected within each time interval. If the number of data sorts collected in a particular time interval is above the threshold level 50, then (as shown in FIG. 3) a "1" is assigned to that time interval, while if the total number of data sorts collected in a time interval is less than the threshold level 50, then a logic "0" is assigned to the interval. The horizontal shrinkage of the eye (e.g., time between spaced intervals having counts above the threshold level) can thus be measured based on this comparison. The total time interval can be determined by summing the time intervals having data edge sorts below the threshold level.

Figure 4:
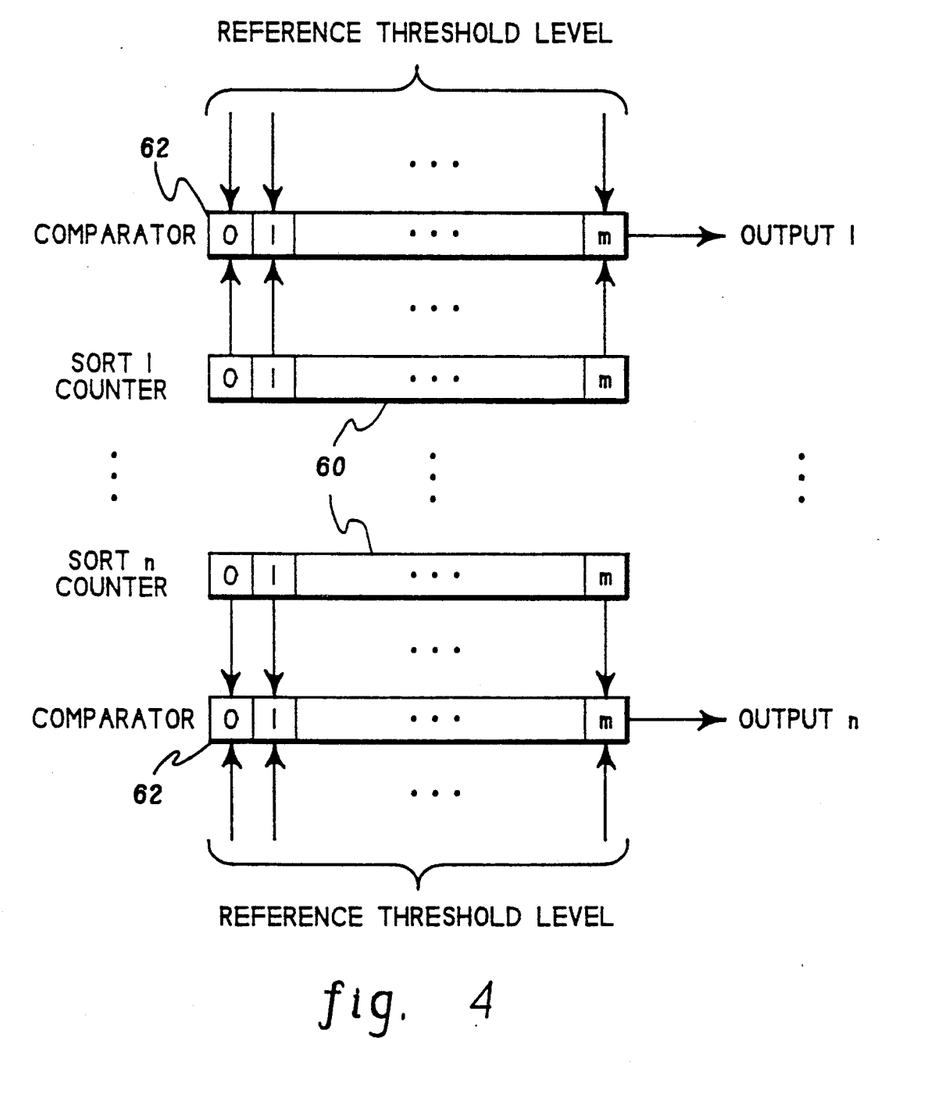
FIG. 4 is a block diagram representation of n counters and n associated comparators of one embodiment of the present invention.

FIG. 4 depicts a threshold circuit comparison technique, which pursuant to one embodiment of the present invention is resident within choose correct clock block 20 of FIG. 1, wherein the number of data edge sorts falling in each of n time intervals are sorted in n corresponding m-bit counters 60. There are n comparator circuits 62 that compare counts of the n counters with a predetermined threshold level. As shown, each comparator 62 implements a word-by-word comparison wherein the m-bits of each counter 60 are compared with a corresponding number of bits of a preselected reference threshold level. If desired, the threshold level for one or more time intervals may be set at a different predetermined number from other time intervals to increase the sensitivity of the monitor to changes in the quality of the link. If the count in a particular time interval counter is below the corresponding threshold level the threshold circuit generates a zero (0) monitor signal and, conversely, if the count is above the threshold level, the threshold circuit generates a one (1) monitor signal. The equivalent condition can be assigned to either monitor signal.

Figure 5:
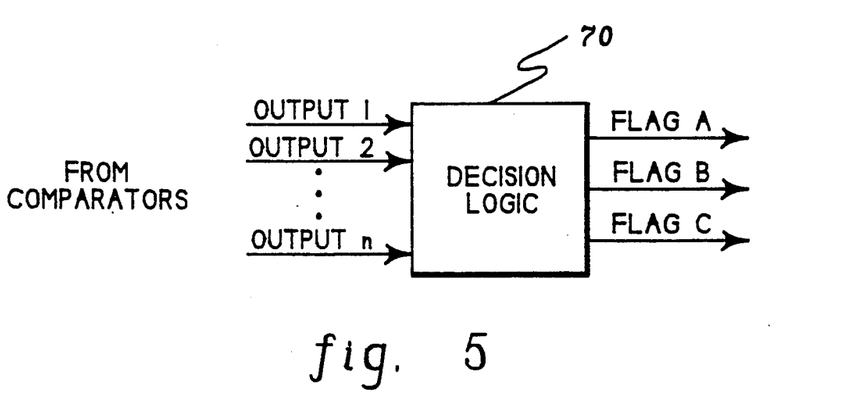
FIG. 5 is a block diagram representation of decision circuitry of one embodiment of the present invention.

The comparator outputs, Output 1, Output 2, ... Output n, of the threshold circuit are, for example, coupled to decision logic 70, which is shown in FIG. 5 and, in one embodiment, is resident within choose correct clock block 20 of FIG. 1. Logic 70 outputs to another portion (not shown) of the communication/data processing system one of a plurality of possible flags (based upon the monitor signals received as outputs from comparators 62) as an indication of received signal quality. By way of example, logic 70 may incorporate pre-established criteria that states that receipt of: three or more zero (0) monitor signals in a row, i.e., on Outputs 1, 2 ... n, is representative of a good quality link, resulting in a first flag being output; only two zero (0) monitor signals in a row is representative of a marginal quality data link, resulting in a second flag being output; and only one zero (0) monitor signal, or none, is indicative of a bad data link, requiring a third data link to be output from the decision logic. Those skilled in the art will recognize that these criteria, again provided by way of example, may be modified in a number of ways, and implemented with a number of different circuits or hardware/software combinations. For example, a processor with supporting registers and read only memory could be used to implement similar evaluation functions.

Typically, the worst case yet acceptable timing jitter level for a particular data link under evaluation will be specified. Assuming this, the monitor of the present invention can be used, pursuant to logic circuitry 70 (FIG. 5), to flag one of the following conditions:

Flag A: data timing jitter is negligibly small (no action required);

Flag B: data timing jitter marginally meets the specification (preventive maintenance is required); or Flag C: data timing jitter does not meet the specification (repair is required).

Unique to the present invention is the provision of Flag B, i.e., an indication that the digital data link under evaluation has degraded in performance, but not yet broken down completely such that repair is required, which is the only function prior amplitude measuring approaches could accomplish. Further, the quality evaluation technique of the present invention is accomplished during normal link operation.

In another specific embodiment, the decision logic of the present invention could be implemented as a table wherein possible monitor signal combinations from the comparators of FIG. 4 are prestored and an appropriate flag for each combination is identified. In such a case, the outputs of the n comparators are then applied to (compared with) the table to select an appropriate flag. Data timing jitter specification is written into the table in such a way that each input binary word produced by the comparators results in a particular data link performance flag, e.g., Flag A, B or C. Those skilled in the art will recognize that additional flags could also be provided depending upon the level of information desired.

From the above discussion it will be observed that the present invention comprises a novel technique for digitally monitoring or diagnosing timing jitter in a digital data link, to thereby ascertain the quality of the link. The approach advantageously permits timing jitter measurement simultaneous with clock extraction and is suitable for high speed applications. In addition, data jitter measurement accuracy is designable to particular application requirements. Further, the monitor approach presented herein beneficially utilizes much of the same circuitry as the specified co-pending applications on digital integrating clock extraction and data edge phase sorting.

Although one embodiment of the present invention has been illustrated in the accompanying drawings and described in the foregoing detailed description, it will be understood that the invention is not limited to the particular embodiment described herein, but is capable of numerous rearrangements, modifications and substitutions without departing from the scope of the invention. The following claims are intended to encompass all such modifications.

We claim:

1. A method of evaluating a digital data link having a stream of digital signals serially transmitted therethrough at a predefined clock rate, said method comprising the steps of:

(a) sorting in time each of a plurality of data edge transitions of the serial stream into one of n counters, each counter corresponding to one of n time intervals, the cumulative length of said n time intervals substantially equaling said predefined clock rate;

(b) for each of n counters corresponding to said n time intervals, subsequent sorting of said plurality of data edge transitions, comparing the number of data edge transitions sorted to said corresponding counter with a predetermined threshold level of data edge transition sorts;

(c) generating, in response to said comparing step (b), a monitor signal for each of said n time intervals, a first monitor signal being generated if the number of data edge sorts in the corresponding counter exceeds the predetermined threshold level of data edge transition sorts and a second monitor signal being generated if the number of data edge sorts in the corresponding counter is less than the predetermined threshold level of data edge transition sorts; and (d) evaluating data timing jitter occurring within said stream of digital signals transmitted through said data link by analysis of the monitor signals produced in said generating step (c).

2. The evaluating method of claim 1, further comprising the step of:

(e) generating, in response to said timing jitter evaluating step (d), a flag signal indicative of the performance of said digital data link.

3. The evaluating method of claim 2, wherein said flag generating step (e) includes generating a first flag if the data timing jitter successfully meets predefined data link specification, a second flag if the data timing jitter marginally meets predefined data link specification, and a third flag if the data timing jitter fails to meet predefined data link specification.

4. The evaluating method of claim 2, further comprising the step of:

(f) periodically repeating steps (a)-(e).

5. The evaluating method of claim 1, wherein said comparing step (b) includes comparing the number of data edge transitions sorted to different ones of said n counters corresponding to said n time intervals with different predetermined threshold levels.

6. The evaluating method of claim 5, wherein said comparing step (b) includes comparing the number of data edge transitions sorted to each of said n counters to a different predetermined threshold number.

7. The evaluating method of claim 1, wherein said evaluating step (d) includes comparing the combination of monitor signals produced in said generating step (c) with predefined possible monitor signal combinations representative of different data timing jitter conditions on said data link.

8. The evaluating method of claim 1, wherein said digital data link comprises a digital data communication link.

9. The evaluating method of claim 8, wherein said digital data communication link comprises a fiber optic digital data communication link.

10. The evaluating method of claim 1, wherein said sorting step (a) includes the steps of:

dividing a locally generated clock signal into n consecutive time intervals, the sum of said time intervals having a period substantially equal to the clock period of said digital signals;

locating each of said plurality of data edge transitions relative to one of said n time intervals; and counting and storing the number of data edge transitions sorted to each of said n time intervals in a corresponding one of said n counters.

11. A circuit for evaluating the data timing jitter of a stream of digital signals serially transmitted through a digital data link at a predefined clock rate, said circuit comprising:

means for sorting in time each of a plurality of data edge transitions of said serially transmitted data stream to one of n counters, each counter corresponding to one of n successive time intervals, the cumulative length of said n successive time intervals substantially equaling said predefined clock rate;

for each of said time intervals, means for comparing the number of data edge transitions sorted to said corresponding counter with a predetermined threshold level of data edge transition sorts, said comparing means being coupled to said sorting means;

means, responsive to said comparing means, for generating a monitor signal for each of said n time intervals, a first monitor signal being generated if the number of data edge sorts to said corresponding counter exceeds said predetermined threshold level of data edge transition sorts and a second monitor signal being generated if the number of data edge sorts to said corresponding counter is less than said predetermined threshold level of data edge transition sorts; and means for evaluating data timing jitter occurring within said stream of digital signals serially transmitted through said digital data link by analysis of said generated monitor signals.

12. The circuit of claim 11 further comprising means, responsive to said evaluating means, for generating a flag signal indicative of the performance of said digital data link.

13. The circuit of claim 12, wherein said flag generating means includes means for generating a first flag if the data timing jitter successfully meets predefined data link specification, a second flag if the data timing jitter marginally meets predefined data link specification, and a third flag if the data timing jitter fails to meet predefined data link specification.

14. The circuit of claim 11, wherein said comparing means includes means for comparing the number of data edge transitions sorted to different ones of said n counters with different predetermined threshold levels.

15. The circuit of claim 14, wherein said comparing means includes means for comparing the number of data edge transitions sorted to each of said n counters with a different predetermined threshold level.

16. The circuit of claim 11, wherein said comparing means includes n comparators, each of said comparators being coupled to a respective one of said n counters for comparing the number of data edge transitions sorted to said respective counter with said predetermined threshold level.

17. The circuit of claim 15, wherein the outputs of said n comparators comprise said generated monitor signals.

18. The circuit of claim 17, wherein said evaluating means includes decision logic for comparing the combination of generated monitor signals with predefined possible monitor signal combinations representative of different timing jitter conditions on said data link.

19. The circuit of claim 11, wherein said sorting means further includes:

a local clock signal coupled to a delay line having n serially connected delay elements, each of said delay elements outputting a delay clock of different phase;

an extraction circuit coupled to receive said serially transmitted data stream for detecting each of said edge transitions and outputting a pulse in response thereto;

logic circuitry coupled to the output of said extraction circuit and to the local clock through the delay line, said logic circuitry receiving said outputted extraction circuit pulse and said plurality of delay clocks for sorting said pulse relative to said delay clocks; and said logic circuitry having n outputs, each output being coupled to a respective one of said n counters for transferring a sorted signal pulse to the appropriate counter.

20. The circuit of claim 19, wherein said logic circuitry comprises combinational logic circuitry.

21. A combined method for simultaneously selecting a retiming signal for a serial data stream and for evaluating the digital data link through which said serial data stream is transmitted, said retiming signal being selected from a plurality of local clock signals of different phase and said stream of serial data being transmitted through said link at a certain data clock rate, said combined method comprising the steps of:

sorting in time each of M data edge transitions of the serial stream into one of n counters, each counter corresponding to one n time intervals, the cumulative length of said n time intervals being approximately equal said data clock rate;

selecting a retiming signal from the plurality of local clock signals such that the retiming signal occurs at a time interval near a minimum number of said M sorted data edge transitions; and evaluating the quality of said digital data link by:
(i) comparing for each of said n counters corresponding to said n time intervals the number of data edge transitions sorted to said corresponding counter with a predetermined threshold level of data edge transition sorts;
(ii) generating, in response to said comparing step (i), a monitor signal for each of said n time intervals, a first monitor signal being generated if the number of data edge sorts in the corresponding counter exceeds the predetermined threshold level of data edge transition sorts and a second monitor signal being generated if the number of data edge sorts in the corresponding counter is less than the predetermined threshold level of data edge transition sorts; and
(iii) evaluating data timing jitter occurring within the stream of digital signals transmitted through the data link by analysis of the monitor signals produced in said generating step (ii).

* * * * *

UNITED STATES PATENT AND TRADEMARK OFFICE
CERTIFICATE OF CORRECTION

PATENT NO. : 5,220,581
DATED : June 15, 1993
INVENTOR(S) : Ferraiolo et al.

It is certified that error appears in the above-indentified patent and that said Letters Patent is hereby corrected as shown below:

The title page should be deleted to be replaced with the attached title page. Sheet 1 of 3 should be deleted to be replaced with the attached sheet, consisting of figures 1-2.

Column 4, line 40, delete "07/550,516" and substitute therefor --07/650,516--.

In the Claims:

Column 9, line 41, delete "15" and substitute therefor --16--.

Signed and Sealed this

First Day of February, 1994

Attest:

BRUCE LEHMAN

Attesting Officer

Commissioner of Patents and Trademarks

United States Patent [19]

Ferraiolo et al.

[11] Patent Number: 5,220,581
[45] Date of Patent: Jun. 15, 1993

[54] DIGITAL DATA LINK PERFORMANCE MONITOR

[75] Inventors: Frank D. Ferraiolo, New Windsor, N.Y.; John E. Gersbach; Ilya Iosephovich Novof, both of Burlington, Vt.

[73] Assignee: International Business Machines, Armonk, N.Y.

[21] Appl. No.: 676,638

[22] Filed: Mar. 28, 1991

[51] Int. Cl.⁵ .......................... H04B 3/46; H03D 3/24
[52] U.S. Cl. ...................................... 375/10; 375/118; 370/105.3; 370/108
[58] Field of Search ................. 375/10, 118, 119, 81, 375/82, 120; 370/105.3, 108; 364/484; 324/77 H

[56] References Cited

U.S. PATENT DOCUMENTS

| | | |
|---|---|---|
| 4,211,920 | 7/1980 | Wakabayashi ............ 385/24 |
| 4,278,850 | 7/1981 | Sato et al. ............ 370/13.1 |
| 4,367,550 | 1/1983 | Douverne ............ 371/5.2 |
| 4,435,849 | 3/1984 | Ilgner et al. ............ 359/117 |
| 4,501,021 | 2/1985 | Weiss ............ 370/85.12 |
| 4,580,263 | 4/1986 | Watanabe ............ 371/5.2 |
| 4,628,507 | 12/1986 | Otani ............ 371/5.2 |
| 4,660,973 | 4/1987 | Mannschke ............ 359/110 |
| 4,672,639 | 6/1987 | Tanabe et al. ............ 375/118 |
| 4,677,648 | 6/1987 | Zurfluh ............ 375/120 |
| 4,710,976 | 12/1987 | Wakabayashi ............ 455/9 |
| 4,841,551 | 6/1989 | Avaneas ............ 375/119 |
| 4,984,249 | 1/1991 | Long et al. ............ 375/119 |
| 5,003,561 | 3/1991 | Dragotin ............ 375/119 |
| 5,022,056 | 6/1991 | Henderson et al. ............ 375/119 |
| 5,022,057 | 6/1991 | Nishi et al. ............ 375/119 |
| 5,095,498 | 3/1992 | DeLuca et al. ............ 375/119 |

FOREIGN PATENT DOCUMENTS

| | | |
|---|---|---|
| 3133724A1 | 3/1983 | Fed. Rep. of Germany . |
| 56-32842 | 4/1981 | Japan . |
| 57-75040 | 5/1982 | Japan . |
| 58-123247 | 7/1983 | Japan . |
| 61-29245 | 2/1986 | Japan . |
| 61-196634 | 8/1986 | Japan . |
| 62-245827 | 10/1987 | Japan . |
| 2191356A | 12/1987 | United Kingdom . |

OTHER PUBLICATIONS

Cooke et al., "Integrated Circuits of a 200 Mbit/s Fiber-Optic Link," IEEE J. Solid State Cir., vol. SC-21, No. 6, 1986, pp. 909-915.
Uda et al., "Integ. Opt. Fiber Data Link Transmitter/-Receiv. for Area Net. Appln.," Fiber & Integ. Optics, vol. 5, No. 5, 1985, pp. 273-289.
"Amer. Nat. Standard for Info. Sys. Fiber Distribution Data Interface (FDDI). Phys. Layer Med. Dep. (PMD)", Amer. National Standards Inst., Inc., Appendix E-System Jitter Allocations. Rev. 4, Apr., 1989.
*Transmission Systems for Communications* AT&T Bell Lab, Chapter 30, pp. 703-715 & 756 & 757, Ed. 5.

Primary Examiner—Curtis Kuntz
Assistant Examiner—Young Tse
Attorney, Agent, or Firm—Heslin & Rothenberg

[57] ABSTRACT

A digital data link performance monitor technique for communication systems and information and data processing systems is disclosed. The technique is based on the integration and analysis of a plurality of sorted data edge transitions of a serial data stream received over the digital data link. The number of data edge sorts to each of n time intervals definitive of the edge histogram is compared with a predetermined threshold level and a monitor signal is generated with each comparison. The combination of monitor signals is then analyzed to determine the amount of data timing jitter, and therefore the quality of the link. Corresponding methods and circuits are described.

21 Claims, 3 Drawing Sheets fig. 1 fig. 1 fig. 2